United States Patent
Kondo et al.

(10) Patent No.: US 8,818,463 B2
(45) Date of Patent: Aug. 26, 2014

(54) RADIO COMMUNICATION SYSTEM, RADIO BASE STATION APPARATUS, AND THEIR CONTROL METHOD

(75) Inventors: Takayuki Kondo, Tokyo (JP); Kenki Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 464 days.

(21) Appl. No.: 13/148,901

(22) PCT Filed: Jan. 28, 2010

(86) PCT No.: PCT/JP2010/000479
§ 371 (c)(1),
(2), (4) Date: Aug. 10, 2011

(87) PCT Pub. No.: WO2010/100820
PCT Pub. Date: Sep. 10, 2010

(65) Prior Publication Data
US 2011/0319030 A1    Dec. 29, 2011

(30) Foreign Application Priority Data

Mar. 3, 2009    (JP) .................................. 2009-048908

(51) Int. Cl.
*H04B 1/38*    (2006.01)
(52) U.S. Cl.
USPC ........................................ 455/574; 455/67.11
(58) Field of Classification Search
CPC . H04W 24/02; H04W 52/0206; H04W 24/00; H04W 52/00; H04B 17/00
USPC ............................................. 455/574, 67.11
See application file for complete search history.

(56) References Cited

U.S. PATENT DOCUMENTS

| | | | |
|---|---|---|---|
| 6,584,330 B1* | 6/2003 | Ruuska | 455/574 |
| 2003/0125062 A1* | 7/2003 | Bethards et al. | 455/517 |
| 2009/0290561 A1* | 11/2009 | Kleindl | 370/338 |
| 2011/0310782 A1* | 12/2011 | Kim et al. | 370/311 |

FOREIGN PATENT DOCUMENTS

| | | |
|---|---|---|
| DE | 102005051291 A | 5/2007 |
| JP | 2003347985 A | 12/2003 |
| JP | 2005026991 A | 1/2005 |
| JP | 2008028499 A | 2/2008 |
| WO | 0207464 A1 | 1/2002 |
| WO | 2007/035447 A2 | 3/2007 |
| WO | 2007073118 A1 | 6/2007 |

OTHER PUBLICATIONS

Japanese Office Action for JP Application No. 2011-502604 mailed on Jul. 16, 2013 with English Translation.
European search report for EP10748424 dated Sep. 19, 2012.

(Continued)

Primary Examiner — April G Gonzales
(74) Attorney, Agent, or Firm — Sughrue Mion, PLLC

(57) ABSTRACT

To provide a radio communication system capable of reducing the power consumption of a radio base station apparatus. A radio communication system according to the present invention includes a user apparatus (2) and a radio base station apparatus (1) that performs radio communication with the user apparatus (2). The radio base station apparatus (1) monitors a communication status of the user apparatus (2) present within a service area of the radio base station apparatus (1), and when there is no user apparatus (2) performing communication, intermittently transmits a signal that is to be transmitted from the radio base station apparatus (1) to the user apparatus (2). The intermittently-transmitted signal is, for example, a downward common channel signal. Further, the intermittent transmission is performed at regular intervals or random intervals.

18 Claims, 14 Drawing Sheets

(56) References Cited

OTHER PUBLICATIONS

Antti Toskala et al: "WCDMA for UMTS: Radio Access for Third Generation Mobile Communications, Physical Layer, Radio Interface Protocols", Sep. 20, 2007, WCDMA for UMTS—HSPA Evolution and LTE, Chichester: Wiley, pp. 91-137,139.

"3rd Generation Partnership Project; Technical Specification Group Radio Access Network; Spreading and modulation (FDD) (Release 8)", 3GPP Standard; 3GPP TS 25.213, 3rd Generation Partnership Project (3GPP), Mobile Competence Centre ; 650, Route Des Lucioles , F-06921 Sophia-Antipolis Cedex; France, No. V8.3.0, Dec. 1, 2008, pp. 1-36.

International Search Report for PCT/JP2010/000479 mailed Apr. 27, 2010.

3GPP TS25.213 V3.9.0, Technical Specification Group Radio Access Network; Spreading and modulation (FDD), (Release 1999), Dec. 2003.

ZTE et al., "Energy Savings Control in UMTS", 15.6.1, 3GPP RAN3#63 Meeting, R3-090247, Feb. 9-13, 2009, Athens, Greece. Cited in the CNOA.

Chinese Office Action for CN Application No. 201080010403.4 issued on Oct. 10, 2013 with English Translation.

* cited by examiner

EXAMPLE OF INTERMITTENT TRANSMISSION (RANDOM INTERVALS)

RADIO COMMUNICATION SYSTEM, RADIO BASE STATION APPARATUS, AND THEIR CONTROL METHOD

TECHNICAL FIELD

The present invention relates to a radio communication system, a radio base station apparatus, and their control method, in particular to a radio communication system, a radio base station apparatus, and their control method capable of reducing the power requirements.

BACKGROUND ART

In recent years, a lot of attention has been focused on techniques to reduce the power consumption of radio base station apparatuses. Patent literature 1 discloses a technique relating to the reduction in power requirements of a radio base station apparatus. FIG. 15 is a diagram for explaining a radio base station apparatus according to Patent literature 1. In FIG. 15, a radio base station apparatus 100 includes a control unit 120 that transmits/receive's a signal 170 to/from a network 160, and signal processing units 130_1 to 130_5 each of which transmits/receives a respective one of signals 171_1 to 171_5 to/from the control unit 120. Further, the radio base station apparatus 100 also includes a transmission/reception unit 140 that transmits/receives transmission/reception signals 172_1 to 172_5, which are transmitted to/received from these signal processing units, to/from a mobile terminal through an antenna 150. The control unit 120 controls the signal processing units 130_1 to 130_5 by transmitting/receiving respective control signals 181_1 to 181_5, and also controls the transmission/reception unit 140 by using a control signal 182. Further, the control unit 120 is connected to a terminal number estimation unit 110, and obtains the estimated number of terminals by using a signal 180.

Further, in the radio base station apparatus shown in FIG. 15, the terminal number estimation unit 110 estimates the number of mobile terminals that are present in the service area based on the number of position registrations of the mobile terminal, the number of access request messages from the mobile terminals, or the number of incoming-call notification massages to the mobile terminals. Then, the control unit 120 turns off the power supply to unnecessary signal processing units 130_1 to 130_5 based on the estimated number of mobile terminals.

CITATION LIST

Patent Literature

Japanese Unexamined Patent Application Publication No. 2003-347985

SUMMARY OF INVENTION

Technical Problem

However, the radio base station apparatus according to the related art continuously transmits pilot information even when there is no user apparatus performing communication that belongs to that radio base station apparatus. As a result, the radio base station apparatus cannot suspend the downward radio transmission, thus continuously consuming electrical power.

An object of the present invention is to provide a radio communication system, a radio base station apparatus, and their control method capable of reducing the power consumption of the radio base station apparatus.

Solution to Problem

A radio communication system according to the present invention includes a user apparatus and a radio base station apparatus that performs radio communication with the user apparatus. The radio base station apparatus monitors a communication status of the user apparatus present within a service area of that radio base station apparatus, and when there is no user apparatus performing communication, intermittently transmits a signal that is to be transmitted from the radio base station apparatus to the user apparatus.

Further, a radio base station apparatus that performs radio communication with a user apparatus according to the present invention monitors a communication status of the user apparatus present within a service area of the radio base station apparatus, and when there is no user apparatus performing communication, intermittently transmits a signal that is to be transmitted from the radio base station apparatus to the user apparatus.

A method of controlling a radio communication system including a user apparatus and a radio base station apparatus that performs radio communication with the user apparatus according to the present invention includes: monitoring a communication status of the user apparatus present within a service area of the radio base station apparatus; when there is no user apparatus performing communication, intermittently transmitting a signal that is to be transmitted from the radio base station apparatus to the user apparatus; and receiving the intermittently-transmitted signal.

A method of controlling a radio base station apparatus according to the present invention includes: monitoring a communication status of a user apparatus present within a service area of the radio base station apparatus; and when there is no user apparatus performing communication, intermittently transmitting a signal that is to be transmitted from the radio base station apparatus to the user apparatus.

Advantageous Effects of Invention

According to the present invention, it is possible to provide a radio communication system, a radio base station apparatus, and their control method capable of reducing the power consumption of the radio base station apparatus.

DESCRIPTION OF EMBODIMENTS

First Exemplary Embodiment

Exemplary embodiments of the present invention are explained hereinafter with reference to the drawings.

Figure 1:
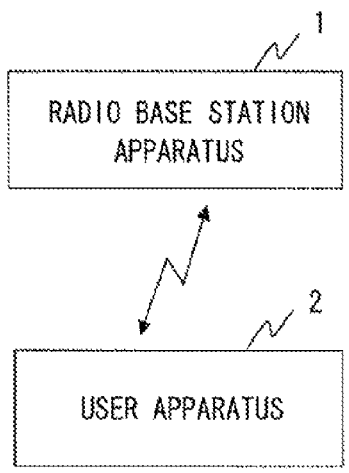
FIG. 1 shows a radio communication system according to a first exemplary embodiment.

FIG. 1 is a diagram for explaining a radio communication system according to this exemplary embodiment. The radio communication system according to this exemplary embodiment includes a user apparatus 2 and a radio base station apparatus 1 that performs radio communication with the user apparatus 2.

The radio base station apparatus 1 monitors the communication status of the user apparatus 2 that is preset within the service area of that radio base station apparatus 1. Further, when there is no user apparatus 2 performing communication, the radio base station apparatus 1 intermittently transmits a signal that is to be transmitted from the radio base station apparatus 1 to the user apparatus 2. In this case, in the case of W-CDMA mode, examples of the signal to be transmitted to the user apparatus include a downward common channel such as a pilot channel and a sync channel. Note that "performing communication" means a state in which the user apparatus 2 is performing a telephone call or data communication with the radio base station apparatus 1. Further, "intermittent transmission" means a transmission method in which signals are thinned out so that the output power is reduced compared to the normal transmission. For example, it can be accomplished by increasing (widening) the interval at which signals are transmitted from the radio base station apparatus, restricting (narrowing) the frequency band used by the radio base station apparatus, or using a similar method. Note that it is also possible to increase the transmission signal interval of the radio base station apparatus and restricting the frequency band used by the radio base station apparatus.

The user apparatus 2 is a terminal capable of performing radio communication with the radio base station apparatus 1, and more than one user terminal 2 may be present within the service area of the radio base station apparatus.

Figure 2:
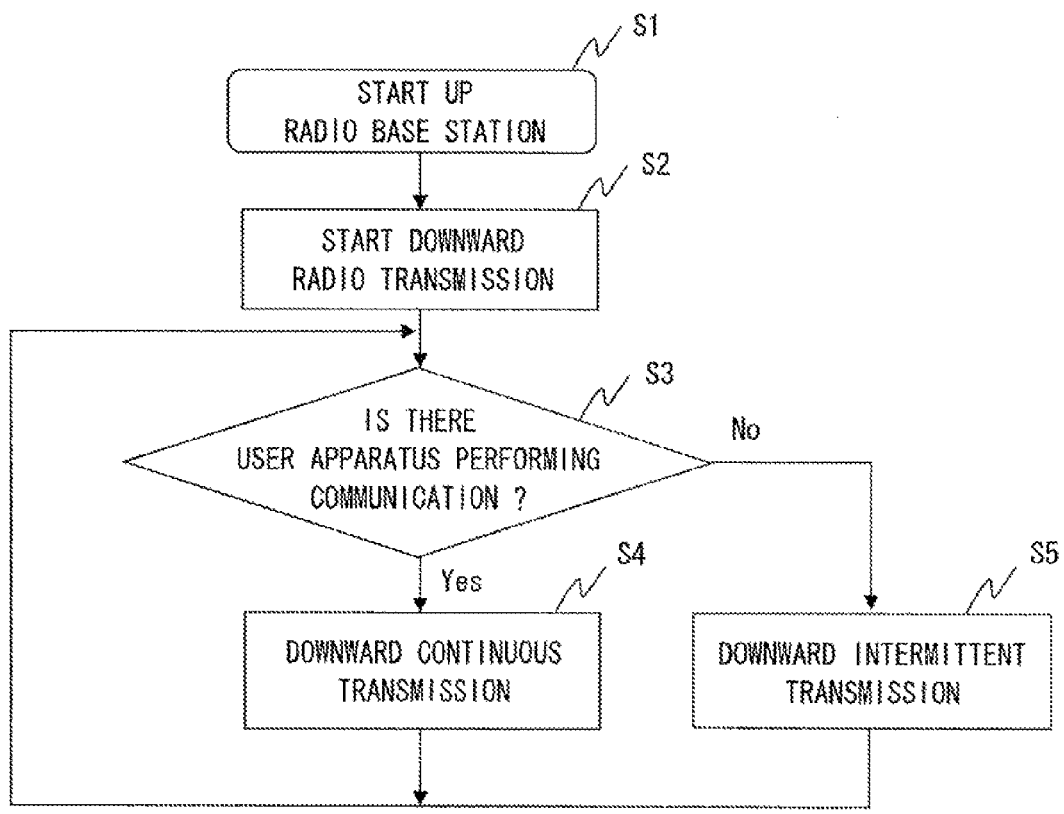
FIG. 2 is a flowchart for explaining an operation of a radio base station apparatus constituting a radio communication system according to a first exemplary embodiment.

Next, an operation of the radio base station apparatus 1 constituting a radio communication system according to this exemplary embodiment is explained with reference to FIG. 2.

Firstly, the radio base station apparatus 1 is started up (S1). Upon starting up, the radio base station apparatus 1 starts downward radio transmission (S2). Then, the radio base station apparatus 1 determines whether or not there is any user apparatus 2 performing communication that belongs to the radio base station apparatus 1 (within the service area) (S3). When there is a user apparatus 2 performing communication that belongs to the radio base station apparatus 1, it performs continuous downward transmission (S4). On the other hand, when there is no user apparatus 2 performing communication that belongs to the radio base station apparatus 1, it performs intermittent downward transmission (S5).

The radio base station apparatus 1 monitors whether or not there is any user apparatus 2 performing communication at regular intervals. Then, when there is a user apparatus 2 performing communication, the radio base station apparatus 1 performs-continuous downward transmission, whereas when there is no user apparatus 2 performing communication, the radio base station apparatus 1 performs intermittent downward transmission. Further, the radio base station apparatus 1 repeats these operations.

Figure 5A:
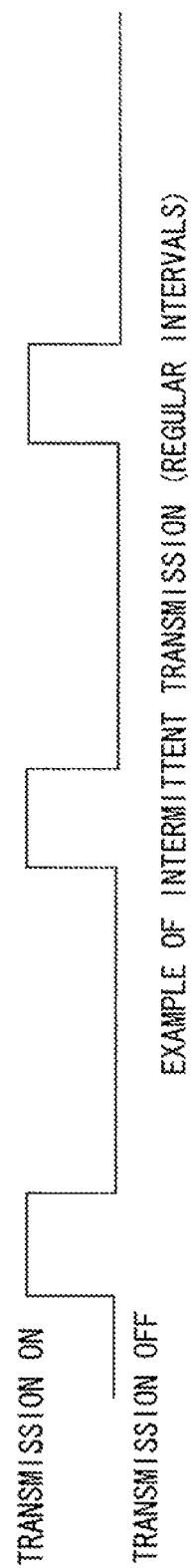
FIG. 5A shows an example of intermittent transmission performed at regular intervals.
Figure 5B:
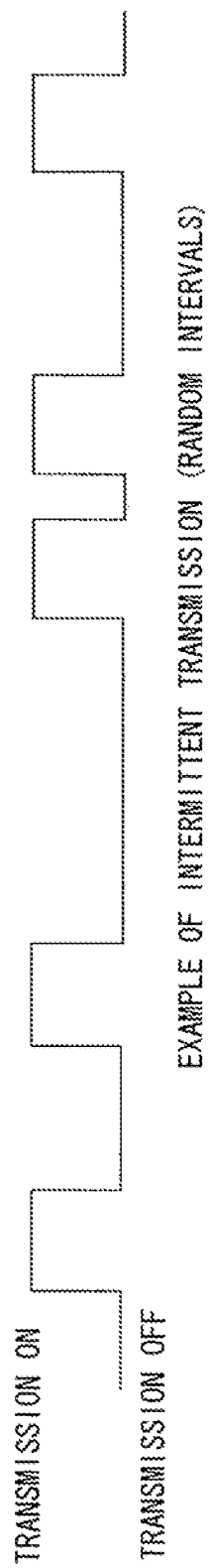
FIG. 5B shows an example of intermittent transmission performed at random intervals.

For the intermittent downward transmission, the signals may be transmitted at regular intervals as shown in FIG. 5A, or may be transmitted at random intervals as shown in FIG. 5B.

In the radio communication system according to this exemplary embodiment, when there is no user apparatus performing communication that belongs to the radio base station apparatus, the radio base station apparatus performs intermittent downward transmission. Therefore, it is possible to reduce the transmission power of the radio base station apparatus. Note that there is a possibility that the user apparatus present within the service area could suffer a radio trouble in some degree because of the intermittent transmission of the radio base station apparatus. However, the user apparatus can maintain the within-service-area status.

Second Exemplary Embodiment

Figure 3:
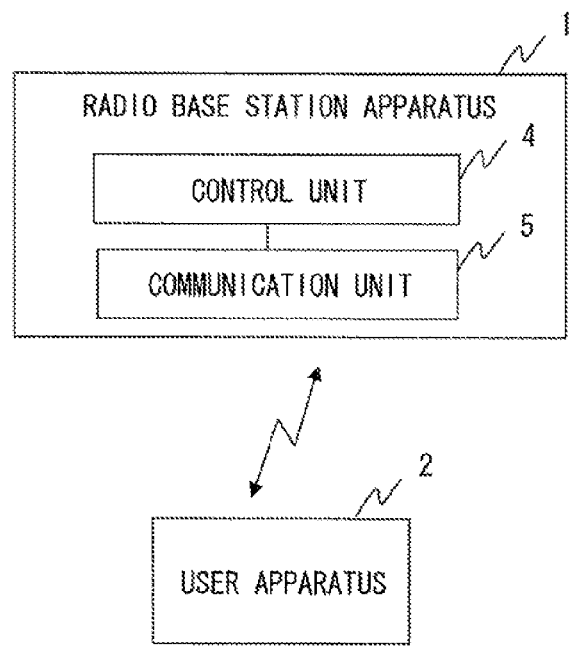
FIG. 3 shows a radio communication system according to a second exemplary embodiment.

Next, a second exemplary embodiment is explained. FIG. 3 is a diagram for explaining a radio communication system according to this exemplary embodiment. Similarly to the first exemplary embodiment, the radio communication system according to this exemplary embodiment includes a user apparatus 2 and a radio base station apparatus 1 that performs radio communication with the user apparatus 2. The radio base station apparatus 1 monitors the communication status of the user apparatus 2 that is preset within the service area of that radio base station apparatus. Further, when there is no user apparatus 2 performing communication, the radio base station apparatus 1 intermittently transmits a signal that is to be transmitted from the radio base station apparatus 1 to the user apparatus 2.

In this exemplary embodiment, the radio base station apparatus 1 includes a control unit 4 and a communication unit 5. When there is no user apparatus 2 performing communication, the control unit 4 controls the communication unit 5 so that a signal that is to be transmitted from the radio base station apparatus 1 to the user apparatus 2 is intermittently transmitted. Further, the communication unit 5 intermittently transmits a signal based on the control of the control unit 4.

Note that the operation of the radio base station apparatus 1 constituting the radio communication system according to this exemplary embodiment is similar to the operation, explained above with reference to FIG. 2, and therefore its explanation is omitted. Further, in this exemplary embodiment, for the intermittent downward transmission, the signals may be transmitted at regular intervals as shown in FIG. 5A, or may be transmitted at random intervals as shown in FIG. 5B.

In the radio communication system according to this exemplary embodiment, when there is no user apparatus performing communication that belongs to the radio base station apparatus 1, the radio base station apparatus 1 performs intermittent downward transmission. Therefore, it is possible to reduce the transmission power of the radio base station apparatus 1.

Third Exemplary Embodiment

Next, as a third exemplary embodiment, a case where a radio communication system according to the present invention is applied to a W-CDMA (Wideband-Code Division Multiple Access) network or an LTE (Long Term Evolution) network is explained.

Figure 4:
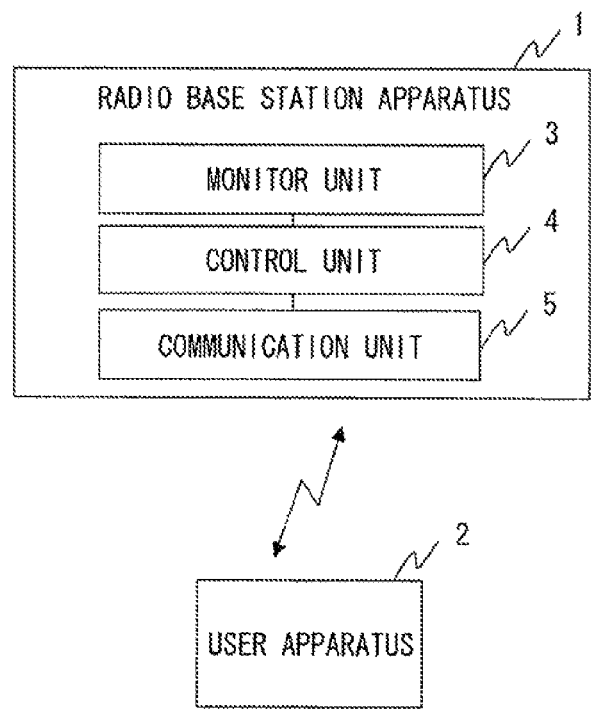
FIG. 4 shows a radio communication system according to a third exemplary embodiment.

FIG. 4 shows a radio communication system according to this exemplary embodiment. Similarly to the first exemplary embodiment, the radio communication system according to this exemplary embodiment includes a radio base station apparatus 1 and a user apparatus 2. The radio base station apparatus 1 includes a monitor unit 3, a control unit 4, and a communication unit 5. The monitor unit 3 of the radio base station apparatus monitors the status of a user apparatus(es) that is present within the service area, and outputs a monitor result to the control unit 4. Specifically, the monitor unit 3 monitors an individual channel (DCH (Dedicated Channel) and/or a transport channel). Note that the monitor unit 3 may also monitor a random access channel (RACH) in addition to the individual channel. The random access channel is a channel through which the user apparatus 2 transmits a communication request for the radio base station apparatus.

When the monitor result from the monitor unit 3 indicates that there is no user apparatus 2 performing communication in the service area, the control unit 4 controls the communication unit 5 so that a signal that is to be transmitted by the communication unit 5 is intermittently transmitted.

The communication unit 5 performs intermittent transmission to the user apparatus 2 based on a control signal from the control unit 4. The signal that is to be intermittently transmitted is a downward common channel including a pilot channel and a sync channel (synchronization channel). Specifically, it is CPICH (Common Pilot Channel) and/or SCH (Synchronization Channel).

Note that the operation of the radio base station apparatus 1 constituting the radio communication system according to this exemplary embodiment is similar to the operation explained above with reference to FIG. 2, and therefore its explanation is omitted here. Further, in this exemplary embodiment, for the intermittent downward transmission, the signals may be transmitted at regular intervals as shown in FIG. 5A, or may be transmitted at random intervals as shown in FIG. 5B.

In the radio communication system according to this exemplary embodiment, when there is no user apparatus performing communication that belongs to the radio base station apparatus 1, the radio base station apparatus 1 performs intermittent downward transmission. Therefore, it is possible to reduce the transmission power of the radio base station apparatus 1.

Fourth Exemplary Embodiment

Next, a radio communication system according to a fourth exemplary embodiment is explained. The configuration of the radio communication system according to this exemplary embodiment is fundamentally the same as that of the radio communication system according to the third exemplary embodiment. The difference from the radio communication system according to the third exemplary embodiment lies in that the radio base station apparatus 1 includes a broadcast unit 6 and the user apparatus 2 includes a decode unit 9.

Figure 6:
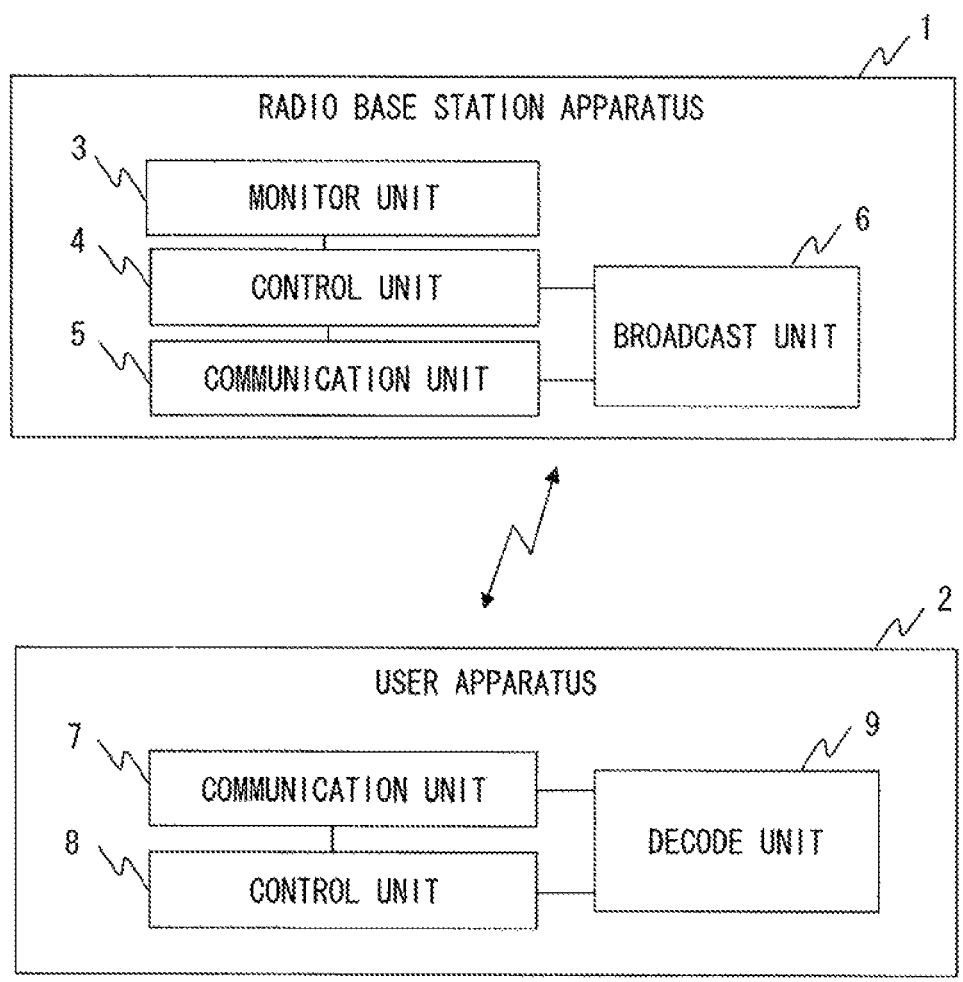
FIG. 6 shows a radio communication system according to a fourth exemplary embodiment.

FIG. 6 shows a radio communication system according to this exemplary embodiment. In FIG. 6, the monitor unit 3 of the radio communication system monitors the status of the user apparatus 2 within the service area. Further, when there is no user apparatus performing communication within the service area, the control unit 4 instructs the communication unit 5 to perform intermittent transmission.

A broadcast unit 6 generates broadcast information. The broadcast information includes information about the cycle and/or the timing at which signals to be transmitted to the user apparatus are thinned out. Examples of the broadcast information include MIB and SIB. MIB (Master Information Block) is schedule information, and is used to notify the user apparatus of a downward transmission band and/or a transmission cycle. SIB (System Information Block) includes necessary information for the connection to a terminal. The communication unit 5 of the radio base station apparatus 1 performs intermittent transmission under instructions from the control unit 4, and transmits broadcast information generated by the broadcast unit 6 to the user apparatus.

A communication unit 7 of the user apparatus 2 receives intermittent transmission and broadcast information from the radio base station apparatus 1. A decode unit 9 of the user apparatus 2 decodes the received broadcast information. Further, a control unit 8 of the user apparatus 2 instructs the communication unit 7 to receive intermittent signals from the radio base station apparatus 1 at the timing based on the decoded broadcast information.

Figure 7:
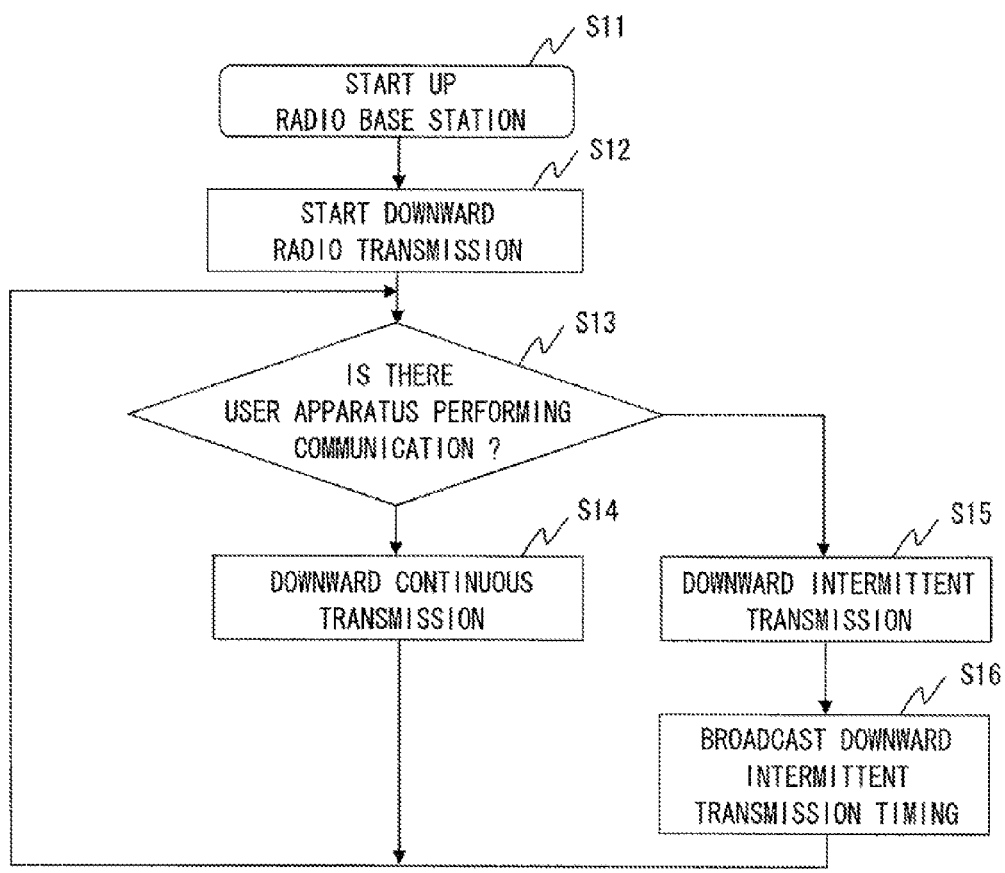
FIG. 7 is a flowchart for explaining an operation of a radio base station apparatus constituting a radio communication system according to a fourth exemplary embodiment.

Next, an operation of the radio base station apparatus constituting the radio communication system according to this exemplary embodiment is explained with reference to FIG. 7.

Firstly, the radio base station apparatus 1 is started up (S11). Upon starting up, the radio base station apparatus 1 starts downward radio transmission (S12). Then, the monitor unit 3 of the radio base station apparatus 1 determines whether or not there is any user apparatus 2 performing communication that belongs to the radio base station apparatus 1 (S13). When the monitor unit 3 determines that there is a user apparatus 2 performing communication that belongs to the radio base station apparatus 1, the control unit 4 instructs the communication unit 5 to perform continuous transmission. The communication unit 5 performs continuous downward transmission under the instruction from the control unit 4 (S14).

On the other hand, when the monitor unit 3 determines that there is no user apparatus 2 performing communication that belongs to the radio base station apparatus 1, the control unit 4 instructs the communication unit 5 to perform intermittent transmission. The communication unit 5 performs intermittent downward transmission under the instruction from the control unit 4 (S15). Further, the broadcast unit 6 generates broadcast information, transmits that broadcast information to the user apparatus 2, and broadcasts the timing of intermittent downward transmission to the user apparatus 2 (S16).

The radio base station apparatus 1 monitors whether or not there is any user apparatus 2 performing communication at regular intervals. Then, when there is a user apparatus 2 performing communication, the radio base station apparatus 1 performs continuous downward transmission, whereas when there is no user apparatus 2 performing communication, the radio base station apparatus 1 performs intermittent downward transmission and broadcasts the intermittent downward transmission timing. Further, the radio base station apparatus 1 repeats these operations.

In the radio communication system according to this exemplary embodiment, when there is no user apparatus performing communication that belongs to the radio base station apparatus, the radio base station apparatus and the user apparatus perform intermittent downward transmission/reception in synchronization with each other. Therefore, it is possible to reduce the transmission/reception power of the radio base station apparatus and the user apparatus.

Note that in this exemplary embodiment, for the intermittent downward transmission, the signals may be transmitted at regular intervals as shown in FIG. 5A, or may be transmitted at random intervals as shown in FIG. 5B.

Fifth Exemplary Embodiment

Next, a radio communication system according to a fifth exemplary embodiment is explained. The configuration of the radio communication system according to this exemplary embodiment is fundamentally the same as that of the radio communication system according to the third exemplary embodiment. The difference from the radio communication system according to the third exemplary embodiment lies in that the radio base station apparatus 1 includes a setting unit 10 and the user apparatus 2 includes a detection unit 11.

Figure 8:
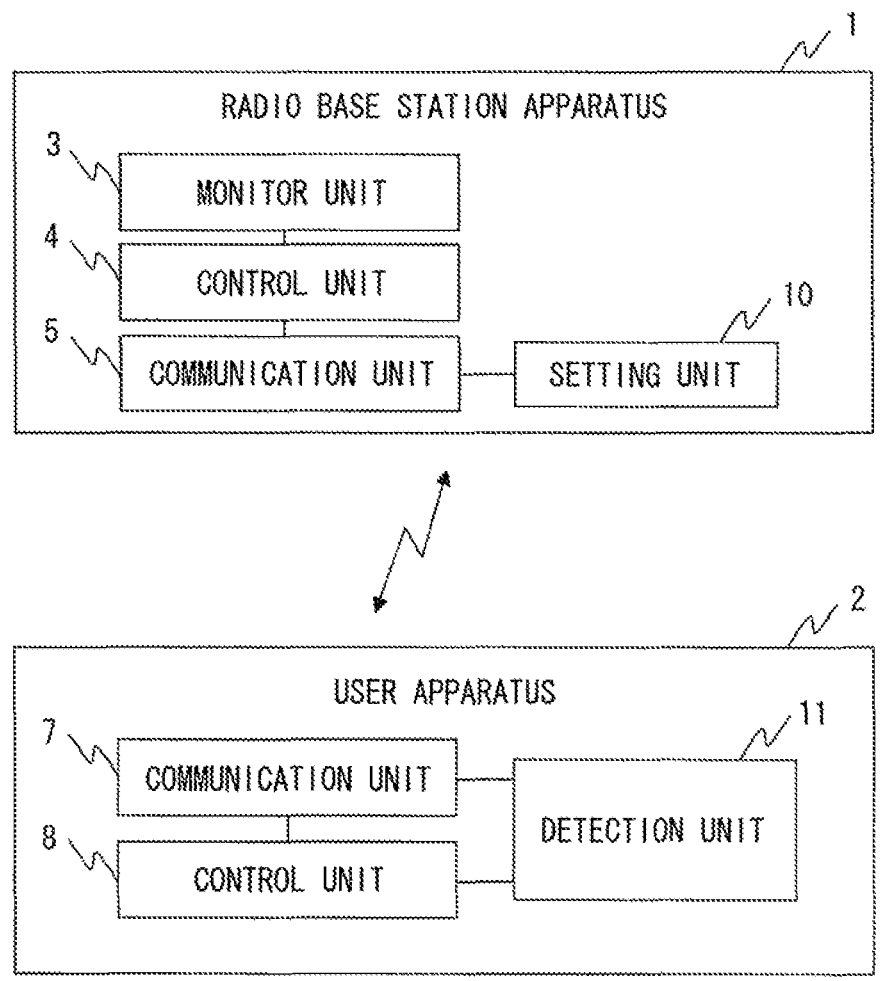
FIG. 8 shows a radio communication system according to a fifth exemplary embodiment.

FIG. 8 shows a radio communication system according to this exemplary embodiment. In FIG. 8, the monitor unit 3 of the radio base station apparatus 1 monitors the status of the user apparatus 2 within the service area. Further, when there is no user apparatus performing communication within the service area, the control unit 4 instructs the communication unit 5 to perform intermittent transmission. A setting unit 10 of the radio base station apparatus 1 instructs the communication unit 5 of a predetermined spread code. The communication unit 5 of the radio base station apparatus 1 synchronizes with the user apparatus 2 in a predetermined cycle by using the spread code, and transmits broadcast information, which is the transmission timing information of intermittent downward signals, to the user apparatus 2.

Note that examples of the predetermined spread code include one or a plurality of specific SSC (Secondary Synchronization Code) and one or a plurality of specific Scrambling Code Group. A predetermined spread code (spread code for femto (e.g., Scrambling Code)) is mentioned in "3GPP specifications, TS25.213 v3.9.0 (2003-12) Technical Specification 3rd Generation Partnership Project; Technical Specification Group Radio Access Network; Spreading and modulation (FDD) (Release 1999), 5.2.3.2 Code allocation of SSC (Secondary Synchronization Code)".

The communication unit 7 of the user apparatus 2 receives a signal from the radio base station apparatus 1. A detection unit 11 of the user apparatus 2 detects a predetermined spread code and notifies the detection of the spread code to the control unit 8 of the user apparatus 2. When the predetermined spread code is detected, the control unit 8 of the user apparatus 2 instructs the communication unit 7 to synchronize with the radio base station apparatus 1 in the cycle that is determined in advance as a system and to intermittently receive the broadcast information. The communication unit 7 of the user apparatus 2 intermittently receives a signal from the radio base station apparatus 1 under the instruction from the control unit 8.

Figure 9:
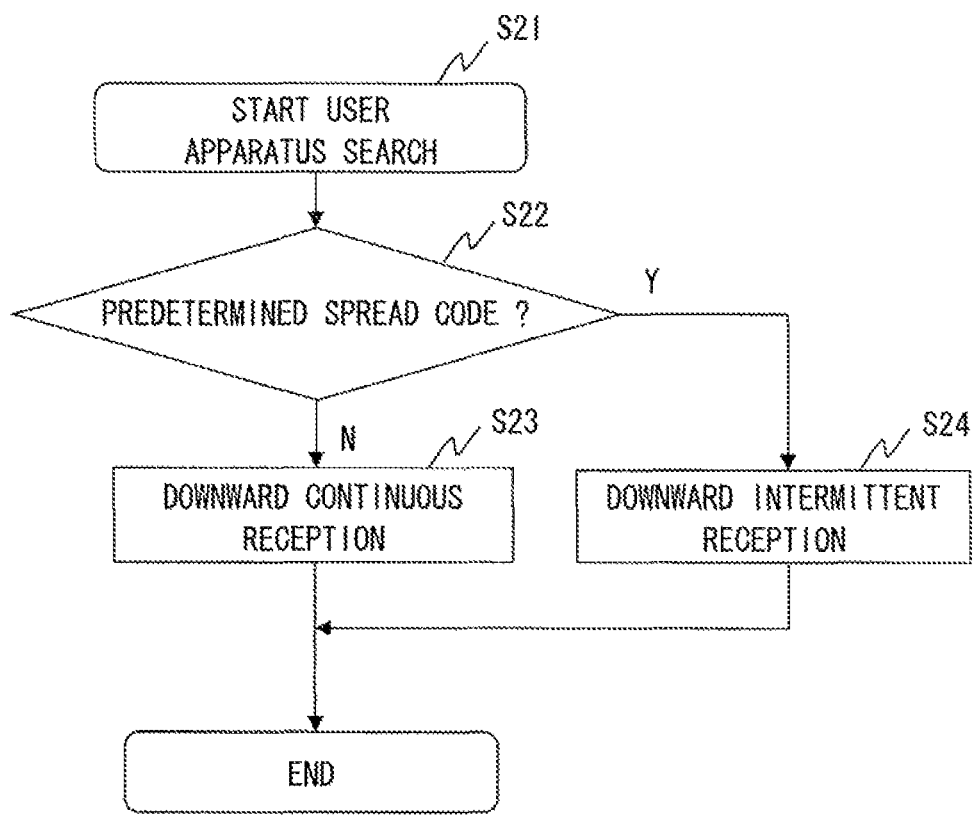
FIG. 9 is a flowchart for explaining an operation of a radio communication system according to a fifth exemplary embodiment.

Next, an operation of the radio communication system according to this exemplary embodiment is explained with reference to FIG. 9. Firstly, the radio base station apparatus 1 starts searching for a user apparatus 2 (S21). The user apparatus 2 receives a signal from the radio base station apparatus 1, and the detection unit 11 of the user apparatus 2 determines whether the received signal is a predetermined spread code or not (S22). When the detection unit 11 of the user apparatus 2 determines that the signal is not a predetermined spread code, it performs continuous downward reception (S23). When the detection unit 11 of the user apparatus 2 determines that the signal is a predetermined spread code, it synchronizes with the radio base station apparatus 1 in a predetermined cycle and performs intermittent downward reception (S24).

In the radio communication system according to this exemplary embodiment, the radio base station apparatus transmits a predetermined spread code and the user apparatus detects the transmitted spread code. Therefore, the user apparatus can recognize that it is a predetermined radio base station apparatus (e.g., femto radio base station apparatus) more quickly. Further, with the radio communication system according to this exemplary embodiment, it is possible to prevent the loss in information transmission between the radio base station apparatus and the user apparatus.

Sixth Exemplary Embodiment

Figure 10:
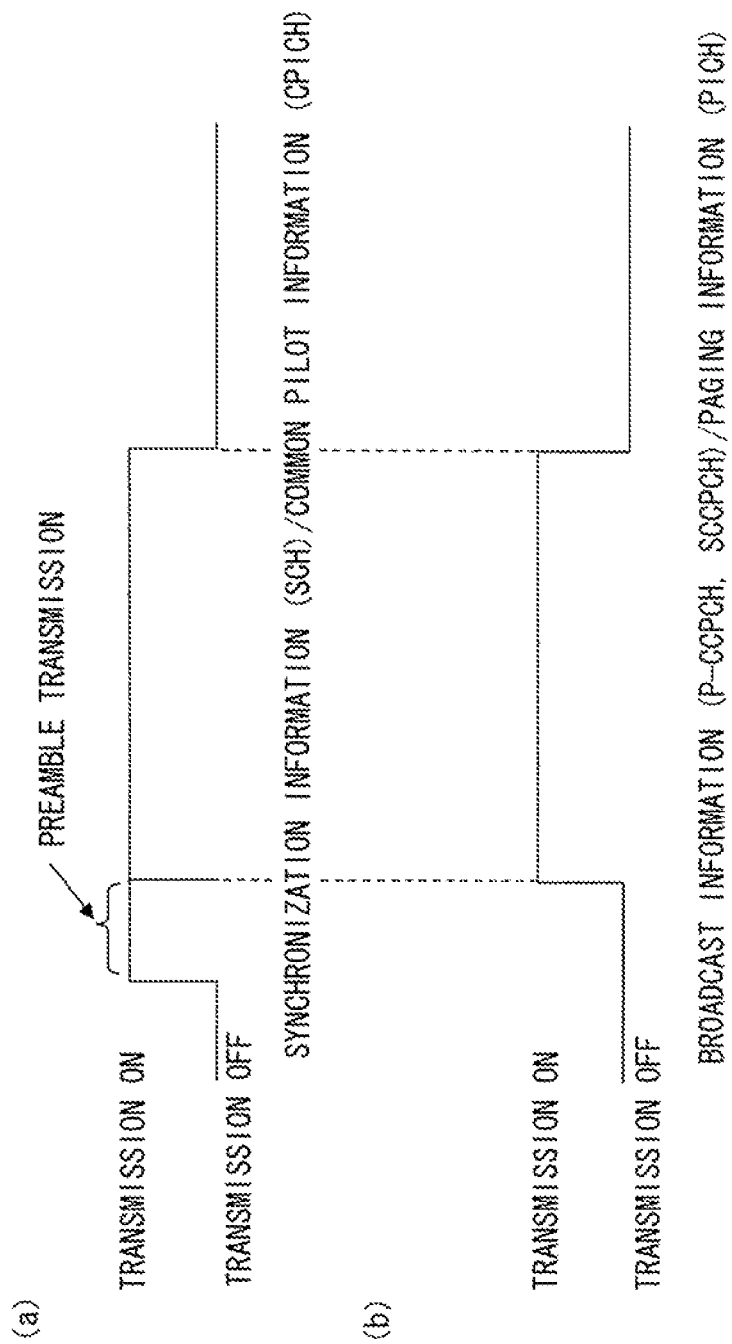
FIG. 10(*a*) shows a timing at which synchronization information (SHC)/common pilot information (CPICH) is transmitted, and FIG. 10(*b*) shows a timing at which broadcast information (P-CCPCH, S-CCPCH)/paging information (PICH) is transmitted.

Next, a radio communication system according to a sixth exemplary embodiment is explained. The configuration of the radio communication system according to this exemplary embodiment is fundamentally the same as those of radio communication systems according to the other exemplary embodiments. As shown in FIG. 10, the radio base station apparatus transmits synchronization information/common pilot information as preamble transmission for a certain period before transmitting broadcast information/paging information in this exemplary embodiment.

FIG. 10 (*a*) shows a timing at which synchronization information (SHC)/common pilot information (CPICH) is transmitted. Further, FIG. 10(*b*) shows a timing at which broadcast information (P-CCPCH, S-CCPCH)/paging information (PICH) is transmitted. As shown in FIGS. 10 (*a*) and 10(*b*), the radio base station apparatus of the radio communication system according to this exemplary embodiment transmits synchronization information (SHC)/common pilot information (CPICH) at a timing that is earlier than the transmission timing of broadcast information (P-CCPCH, S-CCPCH)/paging information (PICH) (preamble transmission).

When the user apparatus receives the preamble transmission of synchronization information (SHC)/common pilot information (CPICH), it detects the start of the data transmission. That is, the user apparatus can detect that that user apparatus is an apparatus that is present within the service area of a predetermined radio base station apparatus more quickly. For example, if the user apparatus can receive common pilot information but cannot receive the broadcast signal within a predetermined time period before and after the reception, the user apparatus can recognize that the radio base station apparatus that has transmitted the common pilot information is in a power saving mode.

With the radio communication system according to this exemplary embodiment, it is possible to improve the accuracy of the downward synchronization correction in the user apparatus, and thereby to prevent the loss of synchronization.

Seventh Exemplary Embodiment

Next, a radio communication system according to a seventh exemplary embodiment is explained. The configuration of the radio communication system according to this exemplary embodiment is also fundamentally the same as those of radio communication systems according to the other exemplary embodiments. This exemplary embodiment is different from the other exemplary embodiments in that (1) the radio base station apparatus transmits information including the type of the radio base station apparatus and the like as the broadcast information and that (2) a flag indicating the start of intermittent transmission is added in the common pilot information (CPICH).

(1) A Case where Information Including the Type of the Radio Base Station Apparatus and the Like is Transmitted as Broadcast Information In the radio communication system according to this exemplary embodiment, the radio base station apparatus can include the type of the radio base station apparatus or identification information that is used to identify the cell of the radio base station apparatus in the broadcast information and transmit the resultant broadcast information. Note that the broadcast information is, for example, MIB (Management Information Block). Further, the identification information is, for example, a predetermined CSGID (Closed subscriber group Cell ID). CSGID is identification information that is used to identify the cell type of the radio base station apparatus such as a macro cell, a micro cell, and a femto cell, and/or the type of the radio base station apparatus.

Then, the user apparatus receives the broadcast information and determines whether or not the received broadcast information includes the above-described identification information. When the above-described identification information is included, the user apparatus starts intermittent reception.

(2) A Case where a Flag Indicating the Start of Intermittent Transmission is Added in Common Pilot Information Further, in the radio communication system according to this exemplary embodiment, the radio base station apparatus can add a flag indicating the start of intermittent transmission in the common pilot information and transmit the resultant common pilot information. The user apparatus receives the common pilot information and determines whether or not the received common pilot information includes a flag indicating the start of intermittent transmission. When the flag indicating the start of intermittent transmission is included, the user apparatus starts intermittent reception.

Eighth Exemplary Embodiment

Next, a radio communication system according to an eighth exemplary embodiment is explained. In the radio communication system according to this exemplary embodiment, the radio communication system according to this exemplary embodiment is applied to an Evolved HSPA (High Speed Packet Access) network or an LTE (Long Term Evolution) network. In these networks, it is possible to adopt a form of Flat Architecture in which RNC (Radio Network Controller) is degenerated into the node B. Note that the configuration of the radio communication system according to this exemplary embodiment is fundamentally the same as the configuration shown in FIG. 4.

The monitor unit of the radio base station apparatus constituting the radio communication system according to this exemplary embodiment determines the presence or absence of communication with a user apparatus based on an individual channel or a random access channel.

Figure 11A:
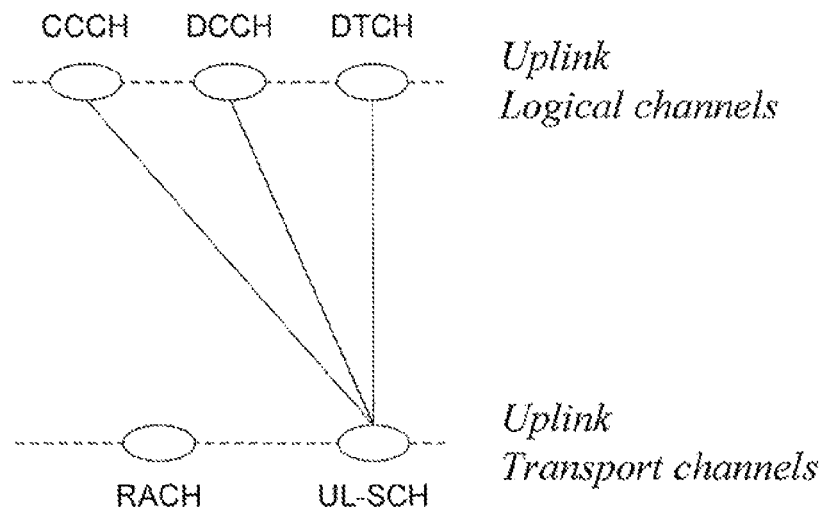
FIG. 11A shows logical channels and transport channels of an LTE system in the case of uplink.
Figure 11B:
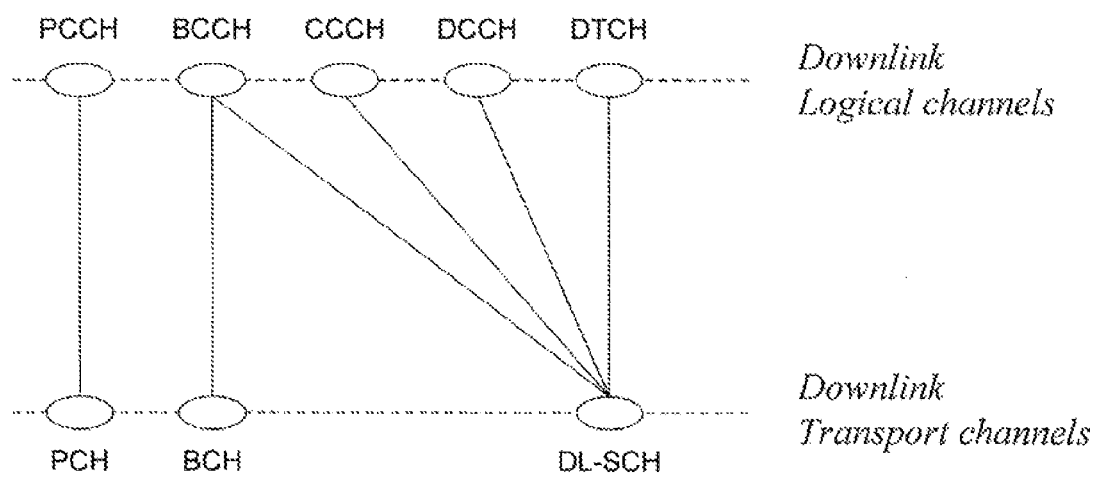
FIG. 11B shows logical channels and transport channels of an LTE system in the case of downlink.

In the case of the determination using the individual channel, the decision is made, for example, by using DCCH/DTCH. That is, when any data transmission/reception using DCCH (Dedicated Control Channel) or DTCH (Dedicated Traffic Channel) has not been performed for a certain period, the monitor unit of the radio base station apparatus can determine that there is no communication with any user apparatus. Note that as shown in FIGS. 11A and 11B, in the LTE system, DCCH/DTCH, which is a logical channel, is transferred through UL-SCH (UpLink-Shared Channel) or DL-SCH (DownLink-Shared Channel), which is a transport channel.

Further, in the case of the determination using a channel other than the individual channel, the decision is made in the following manner. When Random Access Preamble (used in the initial connection and the connection at the time of handover) using PRACH (Physical Random Access Channel), which is a physical channel, has not been received from any user apparatus for a certain period or when the connection process that is to be perform upon the reception of Random Access Preamble has not been performed, the monitor unit of the radio base station apparatus determines that there is no communication with any user apparatus.

The monitor unit 3 of the radio base station apparatus 1 constituting the radio communication system according to this exemplary embodiment determines the presence or absence of communication with a user apparatus by using the above-described technique. Then, when a monitor result from the monitor unit 3 indicates that there is no user apparatus performing communication in the service area, the control unit 4 instructs the communication unit 5 to thin out signals that is to be transmitted by the communication unit 5. The communication unit 5 thins out the signals based on a control signal from the control unit 4.

Figure 12:
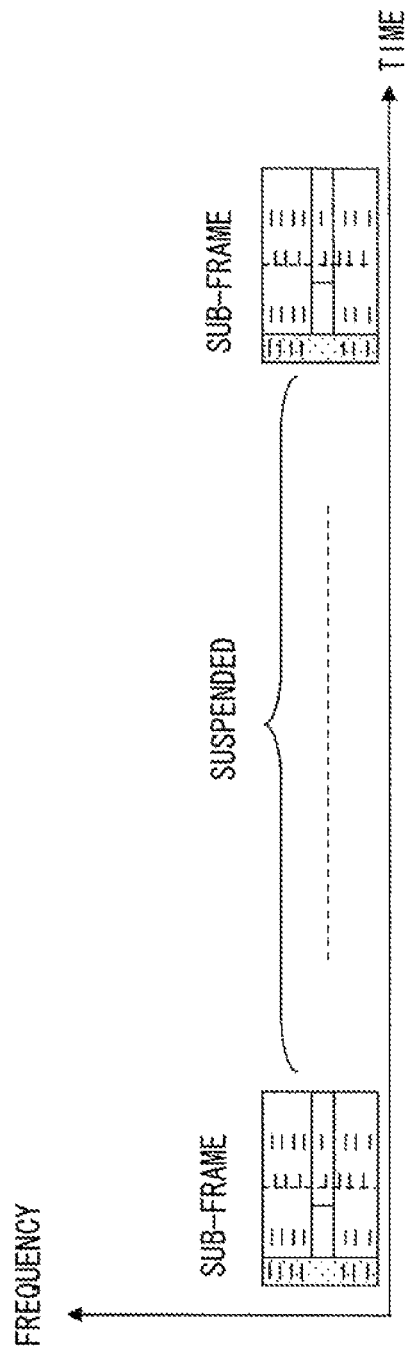
FIG. 12 shows an example where downward signals are thinned out (where the downward signal is suspended for a certain period)

When downward signals are thinned out, all the signals are suspended, for example, for a certain period. In this way, it is possible to thin out the downward signals on the time base. In this process, SS (Synchronization Signal), which is a signal for synchronization, and DL RS (Down Link Reference Signal), which is required for cell identification performed by a user apparatus (also referred to as "UE"), are also suspended. Note that "certain period" is a specific cycle. For example, transmission/suspension may be repeated in a cycle of one second. Further, a plurality of sub-frames may be thinned out at random timings. FIG. 12 shows an example where downward signals are thinned out for a certain period. In FIG. 12, the horizontal axis represents time and the vertical axis represents frequency. In FIG. 12, all the sub-frames of the downward signals are suspended for a certain period. As shown above, by thinning out the downward signals for a certain period, it is possible to reduce the power requirements of the radio base station apparatus.

Ninth Exemplary Embodiment

Next, a radio communication system according to a ninth exemplary embodiment is explained. The configuration of the radio communication system according to this exemplary embodiment is fundamentally the same as that of the radio communication system according to the eighth exemplary embodiment, but is different from the eighth exemplary embodiment in the way of thinning out the downward transmission signals.

In this exemplary embodiment, specific signals are thinned out among the transmission signals. In this way, it is possible to thin out signals on the frequency base. Specifically, the transmission of necessary signals such as SS, which is a signal for synchronization, DL RS for user apparatus identification, and broadcast information (System Information), which is notified to UE by using BCH (Broadcast Channel)

and PDSCH (Physical Downlink Shared Channel) is maintained, while the transmission of user data other than these signals are suspended.

Figure 13:
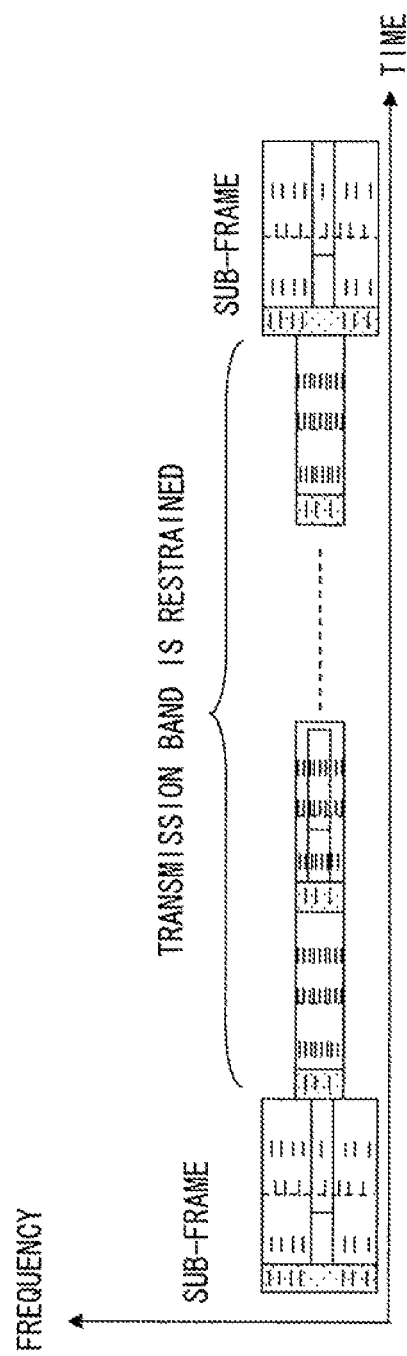
FIG. 13 shows an example where downward signals are thinned out (where the frequency range of the downward signal is restricted)

Note that it is defined in the standardization that SS and BCH are transmitted by using central 6RBs (Resource Blocks) of the whole system band. Therefore, by transmitting other signals such as DL RS and PDSCH (for broadcast information) by using the central RBs as much as possible, it is possible to narrow the band width of the signals transmitted by the radio unit and thereby to reduce the power requirements. FIG. 13 shows a state where the transmission band is restrained between sub-frames. As shown in FIG. 13, DL RS and PDSCH (for broadcast information) that are present in sub-frames are transmitted by using the central RBs.

Note that the technique to reduce the power requirements by narrowing the frequency band used for RB and PDSCH can be used not only for the situation where no UE is present, but also for the situation where the number of UEs is small. Further, although the way of thinning out on the time base and the way of thinning out on the frequency base are separately explained in the eighth and ninth exemplary embodiments respectively, it is also possible to combines both techniques so that signals are thinned out on both the frequency base and the time base.

Tenth Exemplary Embodiment

Next, a tenth exemplary embodiment is explained. In the tenth exemplary embodiment, a case where a radio base station apparatus (eNB) notifies a user apparatus (UE) that the radio base station apparatus (eNB) is in a power saving mode is explained. In the ninth exemplary embodiment, the broadcast information to be transmitted by PDSCH is gathered up on the central RBs as much as possible so that the frequency band width of the radio waves to be transmitted by the communication unit is narrowed and the power requirements is thereby reduced. In the case like this, it is necessary to narrow PDCCH (Physical Downlink Control Channel), through which the information required for the decoding of PDSCH performed by US is notified, into the same band width.

However, for example, even if a radio base station apparatus (eNB) performing transmission with a band width of 20 MHz changes the transmission band width to 5 MHz at an arbitrary timing in order to reduce the power requirements, it is impossible to notify that change to UE. Therefore, there is a possibility that PDCCH cannot be correctly received in UE. Accordingly, either of the following two signals that can be received without using PDCCH may be used so that UE can be notified that the radio base station apparatus (eNB) is in a power saving mode, i.e., the radio base station apparatus (eNB) is performing transmission with a restricted band width.

Firstly, a signal sequence (Downlink Reference Signal) indicating a power saving mode is newly defined. By using this signal, it is possible to notify UE that the radio base station apparatus (eNB) is in a power saving mode. The signal sequence indicating a power saving mode is added to the currently-defined three types of signals consisting of a signal for the entire cell, a signal for an MBSFN cell, and a signal for an individual user. With this signal sequence, it is possible to notify UE of the current restrained band width (e.g., information indicating 1.4 MHz or 3 MHz) as well as the information about implementation of a power saving mode. Note that by making such an arrangement that the central frequency of the restrained band is the same as the central frequency of the unrestrained band, UE can determine on which frequency the signals are gathered up.

Alternatively, it is also possible to notify UE that the radio base station apparatus (eNB) is in a power saving mode by adding an information element to MIB (Master Information Block), which is notified by BCH. That is, a flag (Flag) indicating a power saving mode is added to MIB. Since MIB originally has an information element (dl-Bandwidth) indicating the whole system band provided by a radio base station apparatus (eNB), it is possible to notify UE whether or not the radio base station apparatus (eNB) is in a power saving mode by combining a flag indicating a power saving mode with this information element. For example, by notifying UE of information "power saving mode Flag=False, dl-Bandwidth=n100, normal service is provided by using 20 MH" or "power saving mode Flag=True, dl-Bandwidth=n6, power saving mode, system band is restricted to 1.4 MHz", it is possible to notify whether or not the radio base station apparatus (eNB) is in a power saving mode.

Eleventh Exemplary Embodiment

Next, an eleventh exemplary embodiment is explained. In the above-described exemplary embodiments, when downward transmission signals of a radio base station apparatus are thinned out, the radio base station apparatus makes a decision. In this exemplary embodiment, the decision whether or not a thinning-out process should be performed is made under instructions from a higher-level node.

Figure 14A:
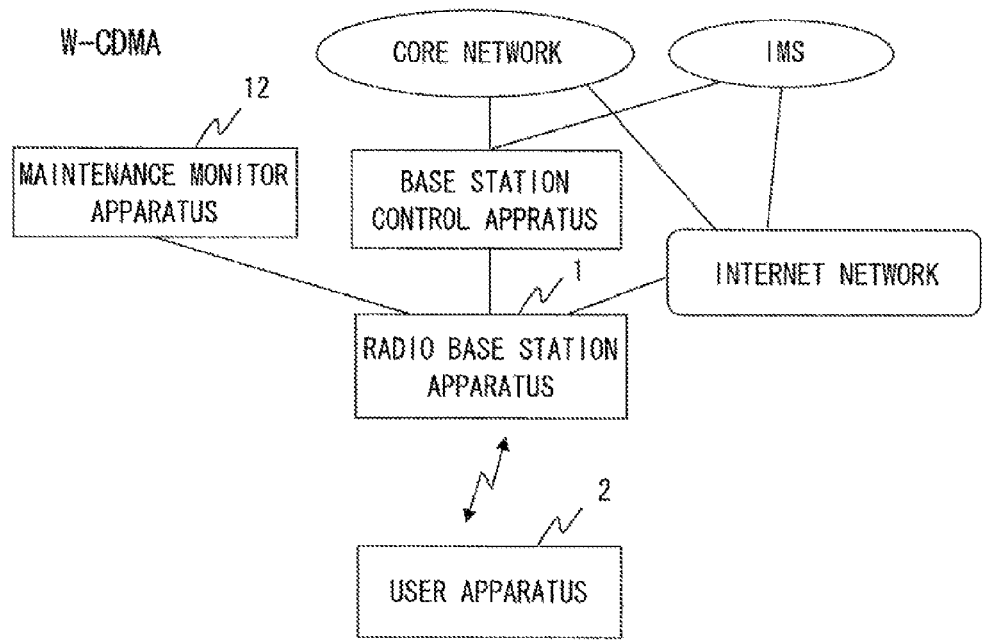
FIG. 14A shows a system configuration in the case of W-CDMA.
Figure 14B:
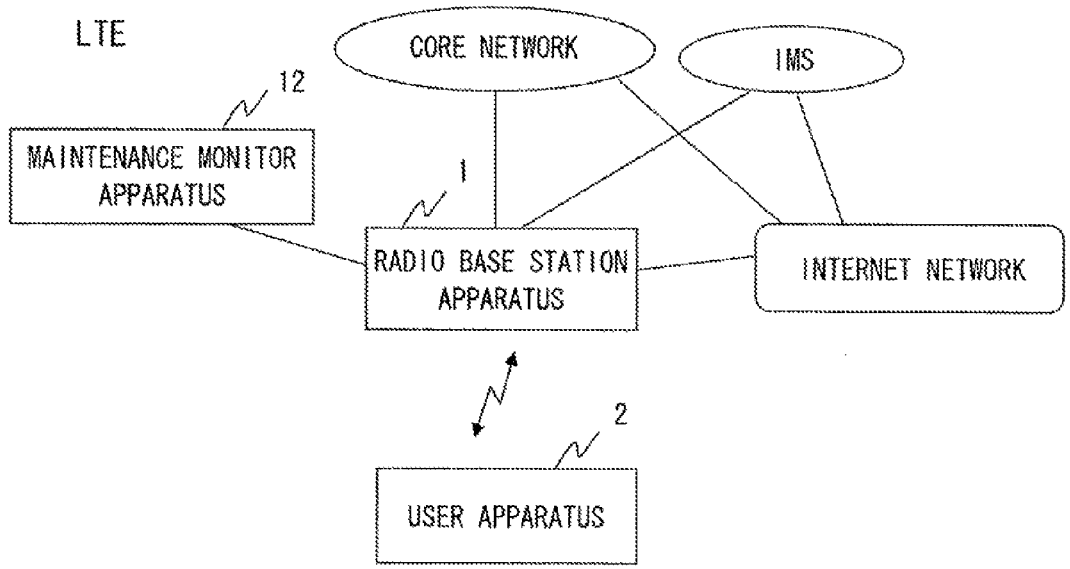
FIG. 14B shows a system configuration in the case of LTE.
Figure 15:
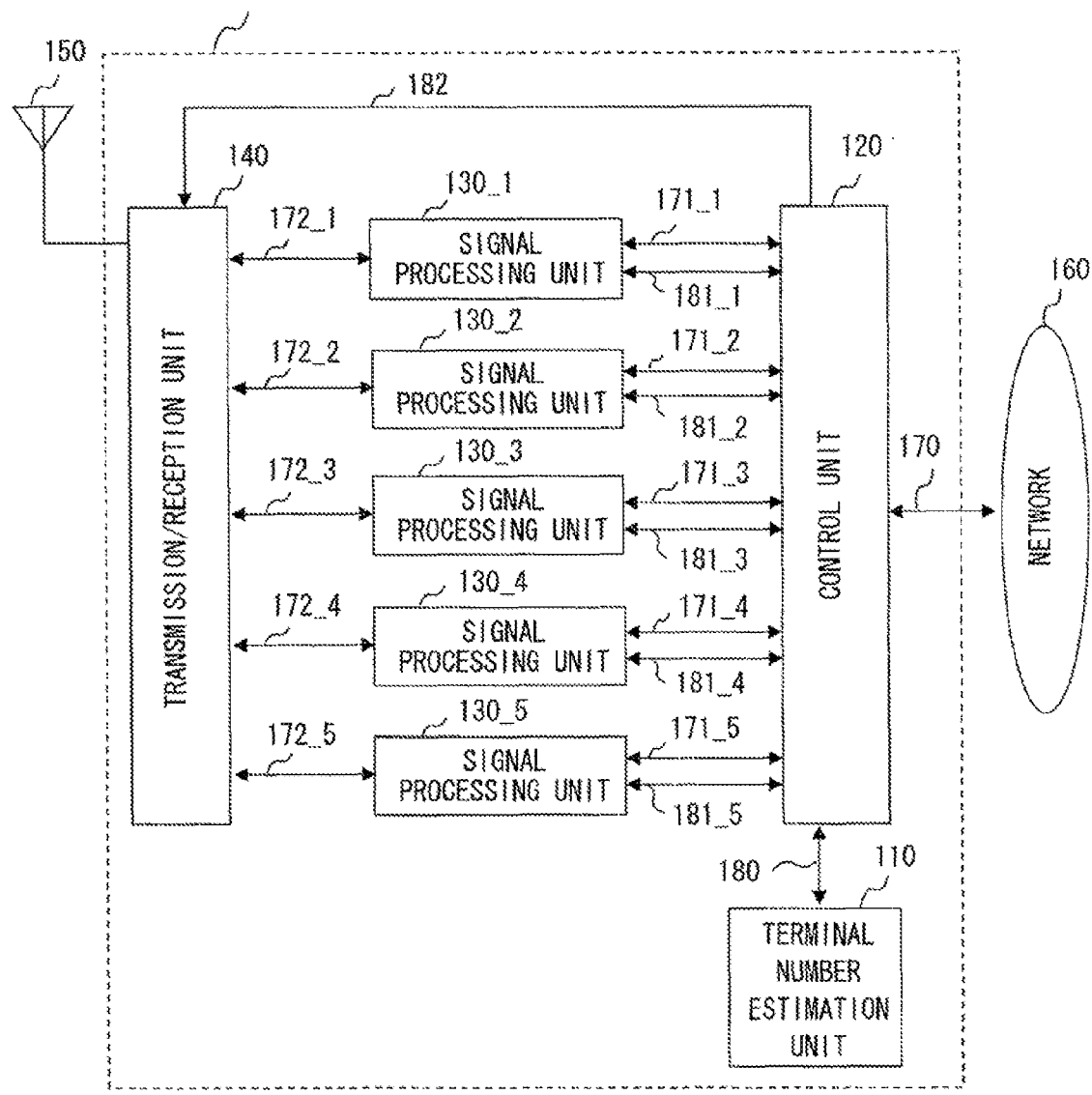
FIG. 15 shows a radio base station apparatus according to related art.

FIGS. 14A and 14B are diagrams for explaining system configurations of radio communication systems according to this exemplary embodiment. FIG. 14A shows a system configuration in the case of W-CDMA, and FIG. 14B shows a system configuration in the case of LTE.

In the W-CDMA system configuration shown in FIG. 14A, each of a core network and IMS (IP Multimedia Subsystem) is connected to a base station control apparatus and an Internet network. Further, a radio base station apparatus is connected to the base station control apparatus and the Internet network. Further, a maintenance monitor apparatus is connected to the radio base station apparatus. Note that the maintenance monitor apparatus has a function of monitoring a plurality of radio base station apparatuses located in a certain area. The radio base station apparatus performs radio communication with a user apparatus.

The LTE system configuration shown in FIG. 14B is the same as the W-CDMA system configuration shown in FIG. 14A except that the base station control apparatus is removed. That is, each of a core network and ISM is connected to a radio base station apparatus and an Internet network. The radio base station apparatus is connected to the Internet network. Further, a maintenance monitor apparatus is connected to the radio base station apparatus. The radio base station apparatus performs radio communication with a user apparatus.

Next, in the system configurations shown in FIGS. 14A and 14B, a case where a decision whether a thinning-out process should be performed or not is made based on an instruction from a higher-level node is explained.

Firstly, a case where necessity or un-necessity of a thinning-out process is determined in the core network is explained. In this case, the situation regarding user's presence within a location area is checked at regular intervals in the core network (S-GW: Serving GateWay or MME: Mobility Management Entity), which is a higher-level node. Then, when it is confirmed that no or a few users are present within the location area, it changes to an intermittent transmission mode. By receiving predetermined instruction information, the radio base station apparatus can implement intermittent transmission.

Next, a case where necessity or un-necessity of a thinning-out process is determined in the maintenance monitor apparatus is explained. In the case of determination made in the maintenance monitor apparatus, the situation regarding UE's presence within a certain area is determined by using the maintenance monitor apparatus. Then, predetermined instruction information (e.g., information instructing the implementation of a thinning-out process) is transmitted to the radio base station apparatus. By receiving predetermined instruction information, the radio base station apparatus can implement intermittent transmission.

Note that when the intermittent transmission is stopped, it is also possible to issue an explicit instruction to stop the intermittent transmission from the core network. For example, in case of the occurrence of emergency, emergency information (e.g., an earthquake warning and the like) is notified from the core network, and the radio base station apparatus repeatedly transmits emergency information on the downward line without suspending the power supply. Further, if the radio base station apparatus receives the above-described emergency information notification when the power supply of the radio base station apparatus has been suspended, the radio base station apparatus starts up and transmits emergency information on the downward line.

Other Exemplary Embodiments

Next, a method of controlling a radio communication system according to this exemplary embodiment is explained. A method of controlling a radio communication system including a user apparatus and a radio base station apparatus that performs radio communication with the user apparatus according to this exemplary embodiment, includes the following steps.
(1) a step of monitoring a communication status of the user apparatus present within a service area of the radio base station apparatus;
(2) a step of, when there is no user apparatus performing communication, intermittently transmitting a signal that is to be transmitted from the radio base station apparatus to the user apparatus; and
(3) a step of receiving the intermittently-transmitted signal.

To implement the method of controlling a radio communication system according to this exemplary embodiment, the radio communication system explained above, for example, can be used.

Further, the method of controlling a radio communication system according to this exemplary embodiment may include the following steps.
(4) a step of, when a signal that is to be transmitted from the radio base station apparatus to the user apparatus is intermittently transmitted, transmitting broadcast information to the user apparatus, the broadcast information being timing information of that intermittently-transmitted signal;
(5) a step of decoding the broadcast information received by the user apparatus; and
(6) a step of receiving the intermittently-transmitted signal based on the decoded broadcast information.

Further, the method of controlling a radio communication system according to this exemplary embodiment may include the following steps.

(7) a step of, when a signal that is to be transmitted from the radio base station apparatus to the user apparatus is intermittently transmitted, transmitting a predetermined spread code to the user apparatus; and
(8) a step of receiving the intermittently-transmitted signal based on the spread code received by the user apparatus.

In the method of controlling a radio communication system according to this exemplary embodiment, when there is no user apparatus performing communication that belongs to the radio base station apparatus, the radio base station apparatus is controlled so as to perform downward intermittent transmission. Therefore, it is possible to reduce the transmission power of the radio base station apparatus.

Next, a method of controlling a radio base station apparatus according to this exemplary embodiment is explained. The method of controlling a radio base station apparatus according to this exemplary embodiment includes: monitoring a communication status of the user apparatus present within a service area of the radio base station apparatus; and when there is no user apparatus performing communication, intermittently transmitting a signal that is to be transmitted from the radio base station apparatus to the user apparatus. To implement the method of controlling a radio base station apparatus according to this exemplary embodiment, the radio base station apparatus explained above, for example, can be used.

In the method of controlling a radio base station apparatus according to this exemplary embodiment, when there is no user apparatus performing communication that belongs to the radio base station apparatus, the radio base station apparatus is controlled so as to perform downward intermittent transmission. Therefore, it is possible to reduce the transmission power of the radio base station apparatus.

Further, in the method of controlling a radio base station apparatus according to this exemplary embodiment, the intermittently-transmitted signal may be a downward common channel signal. Further, in the method of controlling a radio base station apparatus according to this exemplary embodiment, the intermittent transmission may be performed at regular intervals or random intervals.

Note that the present invention is not limited to the above-described exemplary embodiments, and it is obvious that various modifications can be made by those skilled in the art based on what is described in the claims.

For example, each process of the radio base station shown in the above-described exemplary embodiments can be provided as a program to be executed by a computer. In this case, the program can be recorded in and provided as a storage medium, and/or can be provided by transmitting it through a communication medium such as the Internet and the like. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a radio communication medium such as a microwave line.

Incidentally, in recent years, the development of radio base station apparatuses that can be installed indoors has been pursued. Since a cell formed by such a base station apparatus is considerably smaller than that of a base station apparatus whose cover area is established outdoors, this cell is called "femto cell". A radio base station apparatus that forms a femto cell is called "femto radio base station apparatus". In contrast to this, a radio base station apparatus that forms a large-scale cell (usually, called "macro cell") in comparison to the femto cell is called "macro radio base station apparatus". The present invention can be applied not only to these femto radio base station apparatuses and macro radio base station apparatuses, but also to all sorts of other radio base station apparatuses.

Although the present invention is explained with reference to exemplary embodiments in the above explanation, the present invention is not limited to the above-described exemplary embodiments. Various modifications that can be understood by those skilled in the art can be made to the configurations and the details of the present invention without departing from the scope of the present invention.

This application is based upon and claims the benefit of priority from Japanese patent application No. 2009-048908, filed on Mar. 3, 2009, the disclosure of which is incorporated herein in its entirety by reference.

INDUSTRIAL APPLICABILITY

The present invention relates to a radio communication system, a radio base station apparatus, and their control method. In particular, the present invention can be used for radio communication systems, radio base station apparatuses, and their control methods capable of reducing the power requirements.

REFERENCE SIGNS LIST

1 RADIO BASE STATION APPARATUS
2 USER APPARATUS
3 MONITOR UNIT
4 CONTROL UNIT
5 COMMUNICATION UNIT
6 BROADCAST UNIT
7 COMMUNICATION UNIT
8 CONTROL UNIT
9 DECODE UNIT
10 SETTING UNIT
11 DETECTION UNIT
12 MAINTENANCE MONITOR APPARATUS

The invention claimed is:

1. A radio communication system comprising a user apparatus and a radio base station apparatus that performs radio communication with the user apparatus,
wherein the radio base station apparatus monitors a communication status of the user apparatus present within a service area of the radio base station apparatus, and when there is no user apparatus performing communication, intermittently transmits a signal that is to be transmitted from the radio base station apparatus to the user apparatus,
the radio base station apparatus comprises broadcast means that generates broadcast information, and transmits the broadcast information generated by the broadcast means to the user apparatus, the broadcast information being timing information of the intermittently-transmitted signal, and
the user apparatus comprises decode means that decodes the received broadcast information, and receives the intermittently-transmitted signal based on the decoded broadcast information.

2. The radio communication system according to claim 1, wherein the radio base station apparatus comprises control means and communication means,
when there is no user apparatus performing communication, the control means controls the communication means so that a signal that is to be transmitted from the radio base station apparatus to the user apparatus is intermittently transmitted, and
the communication means intermittently transmits the signal based on control of the control means.

3. The radio communication system according to claim 1, wherein the radio base station apparatus comprises monitor means, and
the monitor means monitors a communication status of the user apparatus present within a service area of the radio base station apparatus.

4. The radio communication system according to any one of claims 1, wherein the intermittently-transmitted signal is a downward common channel signal.

5. The radio communication system according to any one of claims 1, wherein the intermittent transmission is performed at regular intervals or random intervals.

6. The radio communication system according to any one of claims 1, wherein the radio base station apparatus transmits identification information to the user apparatus, the identification information being used to identify a cell type of the radio base station apparatus, and
the user apparatus receives the intermittently-transmitted signal based on the received identification information.

7. The radio communication system according to any one of claims 1, wherein the radio base station apparatus adds a flag indicating a start timing of the intermittent transmission to common pilot information of the radio base station apparatus and transmits the resultant common pilot information, and
the user apparatus receives the intermittently-transmitted signal based on the received flag.

8. The radio communication system according to any one of claims 1, wherein the intermittently-transmitted signal is a synchronization signal, common pilot information, broadcast information, and paging information,
the radio base station apparatus transmits the synchronization signal and the common pilot information at a timing earlier than a transmission timing of the broadcast information and the paging information, and
the user apparatus starts data transmission after receiving the synchronization signal and the common pilot information.

9. The radio communication system according to any one of claims 1, wherein the radio base station apparatus determines presence or absence of communication with the user apparatus based on an individual channel.

10. The radio communication system according to any one of claims 1, wherein the radio base station apparatus determines presence or absence of communication with the user apparatus based on PRACH, the PRACH being a physical channel.

11. The radio communication system according to any one of claims 1, wherein when the radio base station apparatus intermittently transmits a signal to be transmitted to the user apparatus, the radio base station apparatus performs a thinning-out process by suspending the signal for a certain period.

12. The radio communication system according to any one of claims 1, wherein when the radio base station apparatus intermittently transmits a signal to be transmitted to the user apparatus, the radio base station apparatus performs a thinning-out process by narrowing a frequency band of the signal for a certain period.

13. The radio communication system according to claim 12, wherein implementation of the thinning-out process is notified to the user apparatus by using a signal sequence indicating that the thinning-out process is performed by narrowing the frequency band or by using MIB notified by BCH.

14. The radio communication system according to any one of claims 11, wherein the radio base station apparatus performs a thinning-out process based on an instruction from a core network, the core network being a higher-level node.

15. The radio communication system according to any one of claims 11, wherein the radio base station apparatus performs a thinning-out process based on an instruction from a maintenance monitor apparatus connected to the radio base station apparatus.

16. A radio communication system comprising a user apparatus and a radio base station apparatus that performs radio communication with the user apparatus,
    wherein the radio base station apparatus monitors a communication status of the user apparatus present within a service area of the radio base station apparatus, and when there is no user apparatus performing communication, intermittently transmits a signal that is to be transmitted from the radio base station apparatus to the user apparatus,
    the radio base station apparatus comprises setting means that sets a predetermined spread code, and transmits the spread code to the user apparatus, and
    the user apparatus comprises detection means that detects the received spread code, and receives the intermittently-transmitted signal based on the spread code.

17. A method of controlling a radio communication system comprising a user apparatus and a radio base station apparatus that performs radio communication with the user apparatus, the method comprising;
    monitoring a communication status of the user apparatus present within a service area of the radio base station apparatus;
    when there is no user apparatus performing communication, intermittently transmitting a signal that is to be transmitted from the radio base station apparatus to the user apparatus;
    receiving the intermittently-transmitted signal;
    when a signal that is to be transmitted from the radio base station apparatus to the user apparatus is intermittently transmitted, transmitting broadcast information to the user apparatus, the broadcast information being timing information of that intermittently-transmitted signal;
    decoding the broadcast information received by the user apparatus; and
    receiving the intermittently-transmitted signal based on the decoded broadcast information.

18. A method of controlling a radio communication system comprising a user apparatus and a radio base station apparatus that performs radio communication with the user apparatus, the method comprising;
    monitoring a communication status of the user apparatus present within a service area of the radio base station apparatus;
    when there is no user apparatus performing communication, intermittently transmitting a signal that is to be transmitted from the radio base station apparatus to the user apparatus;
    receiving the intermittently-transmitted signal;
    when a signal that is to be transmitted from the radio base station apparatus to the user apparatus is intermittently transmitted, transmitting a predetermined spread code to the user apparatus; and
    receiving the intermittently-transmitted signal based on the spread code received by the user apparatus.

* * * * *